US006798339B2

(12) United States Patent
Thompson

(10) Patent No.: US 6,798,339 B2
(45) Date of Patent: Sep. 28, 2004

(54) VEHICLE SECURITY SYSTEM WITH MULTI-VEHICLE COMPATIBLE INTERFACE MODULE FOR DOOR LOCKS AND ASSOCIATED METHODS

(75) Inventor: Michael Stephen Thompson, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 69 days.

(21) Appl. No.: 10/260,320

(22) Filed: Sep. 30, 2002

(65) Prior Publication Data

US 2004/0061597 A1 Apr. 1, 2004

(51) Int. Cl.[7] ................................................ B60R 25/00

(52) U.S. Cl. ............................... 340/426.28; 340/5.72; 307/10.2

(58) Field of Search ......................... 340/426.28, 425.5, 340/531, 533, 5.23, 5.54, 5.64, 5.72; 180/287; 307/10.1, 10.2

(56) References Cited

U.S. PATENT DOCUMENTS 3,628,099 A * 12/1971 Atkins et al. ............... 361/172
4,342,210 A * 8/1982 Denningham .............. 70/278.1
4,887,064 A * 12/1989 Drori et al. ................ 340/5.23
4,996,525 A * 2/1991 Becker et al. ............. 340/5.64
5,184,022 A * 2/1993 Claar et al. ................ 307/10.2
5,278,547 A * 1/1994 Suman et al. .............. 340/5.22
5,654,688 A 8/1997 Allen et al. ................. 340/426
5,965,953 A * 10/1999 Ikeda et al. ................ 307/10.2
5,998,883 A * 12/1999 Yamazaki et al. ......... 307/10.1
6,037,859 A 3/2000 Flick .......................... 340/426
6,131,060 A * 10/2000 Obradovich et al. .......... 701/49
6,157,090 A * 12/2000 Vogel et al. ............... 307/10.1
6,275,147 B1 * 8/2001 Flick ..................... 340/426.25

OTHER PUBLICATIONS

Door locks: Multiple Wire Systems, 4 pages. □□www.the12volt.com/doorlocks/doorlocks/page3asp.*
Door locks: Single Wire Systems, 3 pages. □□www.the12volt.com/doorlocks/doorlocks/page2.asp.*
Door locks: Special Wire Systems, 2 pages. □□www.the12volt.com/doorlocks/doorlocks/page4.asp.*
Door locks: Determining Switch Types, 2 pages. □□www.the12volt.com/doorlocks/doorlocks.asp.*
*Door Locks : Multiple Wire Systems*, 4 pages, www.the12volt.com/doorlocks/page3.asp, copyright ©1999–2002 the 12volt.com.
*Door Locks : Single Wire Systems*, 3 pages, www.the12volt.com/doorlocks/page2.asp, copyright ©1999–2002 the 12volt.com.

* cited by examiner

*Primary Examiner*—Daniel J. Wu
*Assistant Examiner*—Anne V. Lai
(74) *Attorney, Agent, or Firm*—Allen, Dyer, Doppelt, Milbrath & Gilchrist, P.A.

(57) ABSTRACT

A vehicle security system is for a vehicle having a door lock circuit including a door lock switch, and a door lock controller responsive to the door lock switch. The security system includes a security controller for operating the door lock controller, and a multi-vehicle compatible interface module for interfacing to the door lock circuit of a given vehicle from among a plurality of different vehicles. In particular, the vehicle may include a single-wire door lock circuit having at least one of a lock resistance and an unlock resistance associated with a door switch. The multi-vehicle compatible interface module may include a circuit board carrying at least one variable resistor that is settable to match the lock/unlock resistance and thereby permit the security controller to operate the door lock controller.

35 Claims, 3 Drawing Sheets

VEHICLE SECURITY SYSTEM WITH MULTI-VEHICLE COMPATIBLE INTERFACE MODULE FOR DOOR LOCKS AND ASSOCIATED METHODS

FIELD OF THE INVENTION

The present invention relates to the field of vehicle security, and more particularly, to a vehicle security system and door lock interface module therefor.

BACKGROUND OF THE INVENTION

Vehicle security systems are widely used to perform various security-related vehicle functions, such as switching between armed and disarmed modes responsive to remote transmitter. An example of such a vehicle security system is disclosed in U.S. Pat. No. 5,654,688, assigned to the assignee of the present invention, wherein a number of remote transmitters capable of operating the controller is displayed to the user so that the user can be sure that no unauthorized transmitters have been learned to into the system. U.S. Pat. No. 6,037,859 also assigned to the assignee of the present invention, discloses a vehicle security system wherein the receiver portion may be mounted in the windshield area to provide an increased operating range from the remote transmitter. Various switches and indicators are also provided on the window portion for user convenience.

Another function commonly performed by a vehicle security system is the remote operation of the vehicle door locks also based upon signals from the user-carried remote transmitter, for example. More particularly, many vehicles include power door locks including at least one door lock switch, a door lock control unit responsive to the switches and that, in turn, operates one or more door lock motors. One type of power door lock system includes a single wire extending from the door lock switch to the door lock control unit. A predetermined voltage, e.g. ground or positive twelve volts, for example, is coupled from the door lock switch to a first terminal of a respective lock or unlock resistance to generate a corresponding voltage signal at the door lock controller to thereby lock or unlock the door locks.

Unfortunately, different manufacturers and different vehicles within a manufacturer's vehicle line typically have different lock and unlock resistances even for the single wire schemes. Accordingly, installation of an after-market security system typically includes first determining the lock and unlock resistances associated with the door lock switch. Once determined, respective fixed resistors matching these resistances are provided to interface one or more switching relays of an interface device to the door lock circuit. Of course, maintaining an inventory of different resistors is cumbersome, and the steps to determine, select, and install the resistors, may be time consuming and subject to error. Of course, there are also other schemes for operating the door locks, such as, a multi-wire negative pulse scheme, a multi-wire positive pulse door lock scheme, and reversal rest at a predetermined voltage (ground or positive) scheme.

SUMMARY OF THE INVENTION

In view of the foregoing background, it is therefore an object of the present invention to provide a vehicle security system and associated methods that permit ready interface to different door lock circuits of different vehicles.

This and other objects, features and advantages in accordance with the present invention are provided by a vehicle security system for a vehicle having a door lock circuit including at least one door lock switch and at least one door lock controller responsive thereto, and wherein one or more variable resistors are provided in an interface module. More particularly, the vehicle security system may include a security controller for selectively operating the at least one door lock controller, and a multi-vehicle compatible interface module for interfacing the security controller to the door lock circuit of a given vehicle from among a plurality of different vehicles. The door lock circuit of a vehicle can include, for example, a single-wire door lock circuit having at least one of a lock resistance and an unlock resistance to be selectively connected in series with a voltage reference to operate the door lock controller. In some embodiments, the multi-vehicle compatible interface module may include a circuit board, a first variable resistor, and a second variable resistor, both carried by the circuit board. The first and second variable resistors can be set to match the respective lock and unlock resistances of the door lock switch.

The door lock circuit can be a positive single-wire door lock circuit or a negative single-wire door lock circuit. Accordingly, the multi-vehicle compatible interface module can include circuitry for interfacing to the respective positive or negative single-wire door lock circuit.

The interface module can also include a severable wire loop extending outwardly from the circuit board and having opposing ends connected in parallel with one of the first and second variable resistors. The severable wire loop connected in parallel thus defines a selectable bypass jumper. The first and second variable resistors can each be provided by multi-turn variable resistor, such as operable over a range of about fifteen to twenty turns, for example.

According to another feature of the invention, the multi-vehicle compatible interface module can also be compatible with other door lock schemes in addition to the single-wire schemes. For example, the interface module can include circuitry carried by the circuit board for interfacing with a negative or positive pulse multi-wire door lock circuit, or with the reversal rest at a predetermined voltage door lock circuit.

A method aspect of the invention is for interfacing a vehicle security controller to a vehicle door lock circuit including at least one of a lock resistance and an unlock resistance to be selectively connected in series with a voltage reference by a door lock switch to thereby operate a door lock controller. The method may comprise connecting a multi-vehicle compatible interface module between the security controller and the door lock circuit. The multi-vehicle compatible interface module may include at least one variable resistor and associated circuitry. The method may further include setting the at least one variable resistor of the multi-vehicle compatible interface module to match at least one of the lock resistance and unlock resistance of the vehicle door lock circuit.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
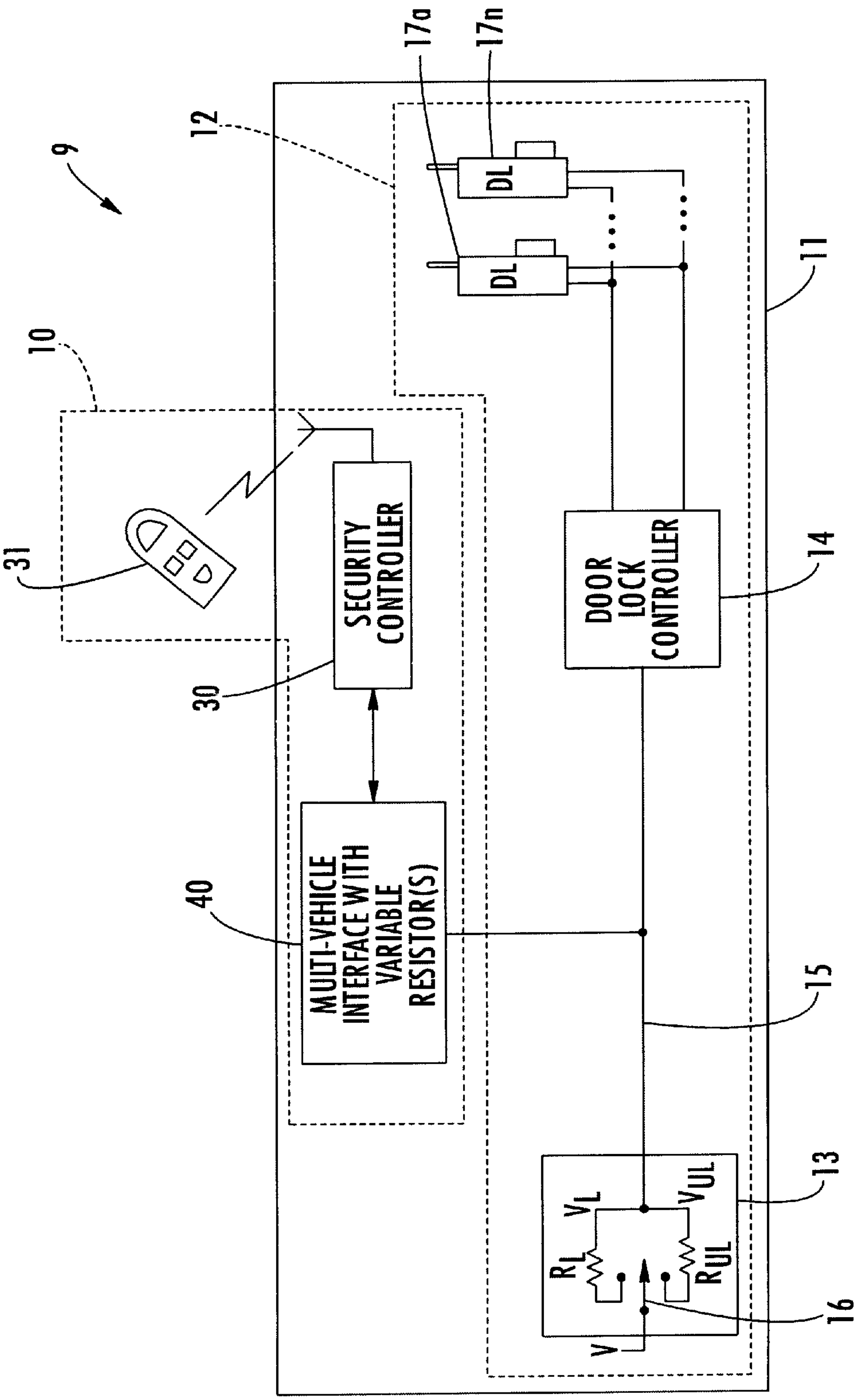
FIG. 1 is a schematic block diagram of a vehicle security system including a multi-vehicle compatible interface module according to the present invention.

Referring to FIG. 1, a vehicle system 9 including a vehicle security system 10 for the vehicle 11 is now described. The vehicle security system 10 includes a security controller 30 and a multi-vehicle compatible interface module 40 connected thereto. The security controller 30 may include a wireless receiver that receives signals from a remote transmitter 31 carried by the user when away from the vehicle 11. The security system 10 may be a full security system for sensing a security breach, such as a door opening and sounding an alarm, or can be a security system just unlocking and locking the doors, and/or a security system that just remote starts the vehicle engine as will be appreciated by those skilled in the art. Accordingly, the remote transmitter 31 may send signals to arm/disarm a full security system, to lock or unlock vehicle doors, and/or to remote the vehicle engine, for example. Other similar operations are also contemplated by the present invention as will be appreciated by those skilled in the art.

The vehicle 11 also includes a door lock circuit 12 that, in turn, illustratively includes a door lock switch 13 and a door lock controller 14 connected to and responsive to the door lock switch. The door lock switch 13 illustratively provides a first or lock voltage $V_L$, and a second or unlock voltage $V_{UL}$, onto the single wire is connecting the door lock switch 13 and the door lock controller 14. Although the terms "single wire" and "single-wire" are used herein, those of skill in the art will appreciate that there is also typically a ground or return path not shown.

The two voltages $V_L$ or $V_{UL}$ may be generated by passing a current from a voltage source V selectively through one of the two respective resistance paths, that is, through one of the resistors $R_L$ or $R_{UL}$ using the manual switch 16, for example, as will be appreciated by those skilled in the art. As will also be appreciated by those skilled in the art, different vehicles may use different voltages for locking and unlocking, and these voltages can be generated by respective resistances. Of course, for some vehicles, one of the voltages may be the same as the supply voltage V. Accordingly, for such a scenario, the resistance would be zero.

The door lock and unlock voltages $V_L$ and $V_{UL}$ are selectively applied to the input of the door lock controller 14 of the door lock circuit 12. Relays and/or solid state circuitry of the door lock controller 14 process the input voltage signals and apply the appropriate control voltages to one or more of the door lock motors 17*a*–17*n* as will be appreciated by those skilled in the art.

The vehicle security system 10 also includes the multi-vehicle compatible interface module 40 for interfacing the security controller 30 to the door lock circuit 12 of a given vehicle 11 from among a plurality of different vehicles. In particular, the multi-vehicle compatible interface module 40 can be readily connected into an existing vehicle as part of a retrofit installation of the security system 10, for example. The interface module 40 can be connected to the door lock circuit 12 at any point along the single wire 15 route from the output of the door switch 13 to the input of the door lock controller 14 thereby greatly simplifying installation as will be appreciated by those skilled in the art. Moreover, the multi-vehicle compatible interface module 40 includes one or more variable resistors 44, 46 to permit the installer to set the module for operation in a desired vehicle 11 from among a plurality of different vehicles having different lock and unlock voltages $V_L$ and $V_{UL}$.

Figure 2:
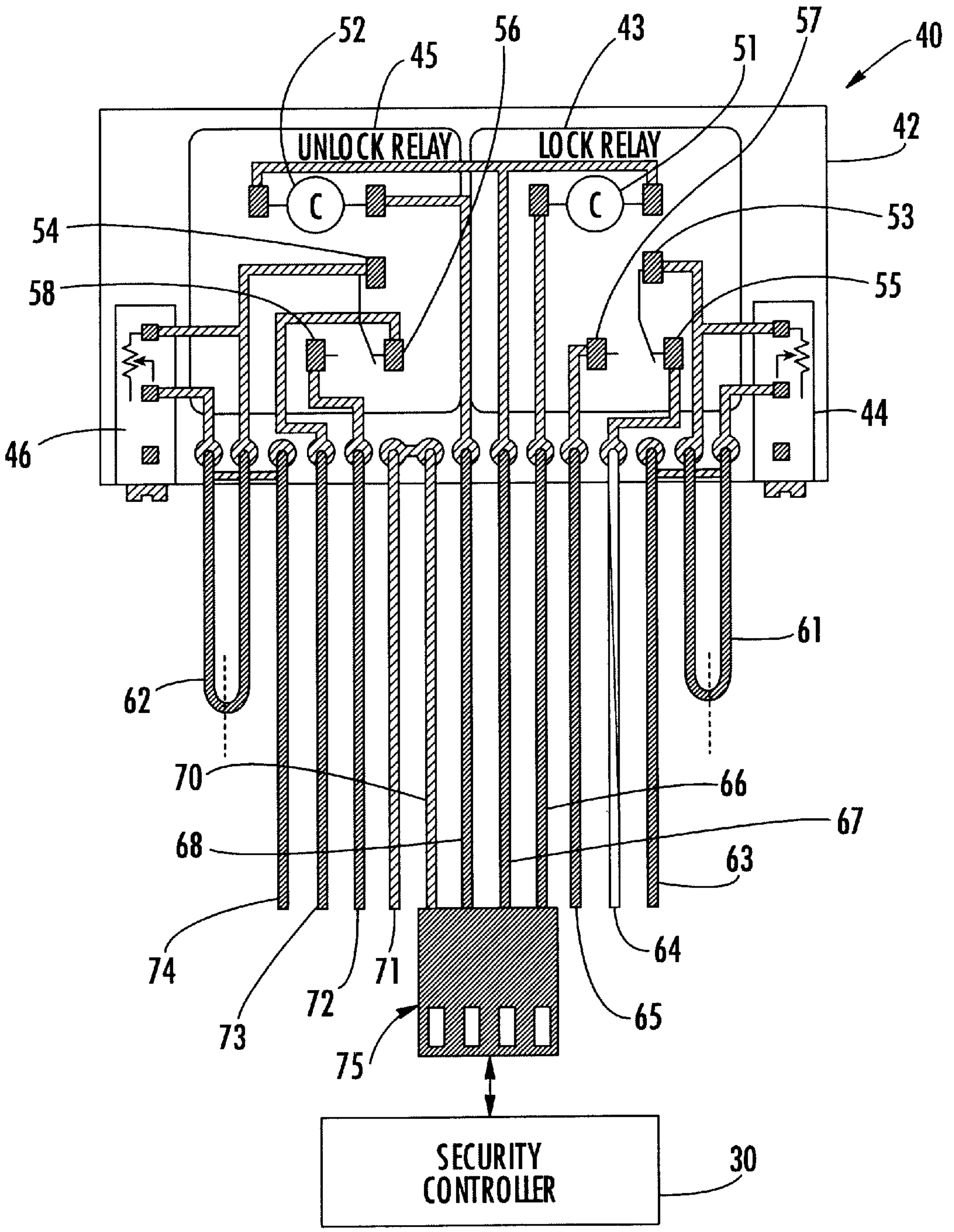
FIG. 2 is more detailed schematic diagram of the multi-vehicle compatible interface module as shown in FIG. 1.

Referring now additionally to FIG. 2, the multi-vehicle compatible interface module 40 is further described. The interface module 40 illustratively includes a circuit board 42, and a first or lock-matching variable resistor 44, and a second or unlock-matching variable resistor 46 mounted on the circuit board. A lock relay 43 and an unlock relay 45 are also illustratively mounted on the circuit board 42. Both relays 43, 45 may be single-pole, double-throw (SPDT) relays having a 30 to 40 ramp rating for the contacts, for example, although other equivalent electromechanical and/or solid state circuitry is also contemplated by the present invention.

In the illustrated embodiment, each SPDT relay 43, 45 includes a respective coil 51, 52, a common contact 53, 54, a normally closed contact 55, 56, and a normally open contact 57, 58. A first severable wire loop 61 is connected in parallel across the first variable resistor 44. If the first severable wire loop 61 is left intact, the first variable resistor 44 is effectively shunted, and, conversely, if the first severable wire loop is severed, the first variable resistor effectively provides its resistance in the circuit as will be appreciated by those skilled in the art. The second severable wire loop 62 operates in a similar fashion to shunt the second variable resistor 46 or leave it in the circuit as will also be appreciated by those skilled in the art. Both several loops 61, 62 may extend outwardly from the circuit board 42 and a housing, not shown, covering the circuit board to facilitate access to the loops by the installer.

Each of the first and second variable resistors 44, 46 can advantageously be provided by a multi-turn variable resistor. Accordingly, each of the variable resistors 44, 46 can be set to a desired resistance depending on the resistance that is required to match the lock and unlock resistances $R_L$, $R_{UL}$ of the door lock switch 13. Each multi-turn variable resistor 44, 46 can be operable over a wide range, but preferably over a range of about fifteen to twenty turns. An installer can use a measuring device, such as a digital multi-meter or any other measuring device as understood by those skilled in the art, to read and set the resistor value.

As an example, a 2001 Chevrolet Malibu has a lock resistance value $R_L$ of zero, an unlock resistance value $R_{UL}$ of 1.5 K ohms, and a negative polarity. Accordingly, the lock severable loop 61 is left intact, the unlock severable loop 62 is severed, and the unlock resistor 46 is set to 1.5 K ohms. The output polarity is also set to negative as will be explained in further detail below with reference to the different exemplary signals lines. As a further example, a Chevrolet Monte Carlo has a lock resistance $R_L$ of 470 ohms, an unlock resistance $R_{UL}$ of zero ohms, and a negative polarity. Accordingly, the unlock severable loop 62 is left intact, the lock severable loop 61 is severed, and the lock resistor 44 is set to 470 ohms.

The remaining lines or connections to the circuit board 42 for the illustrated embodiment of the multi-vehicle compatible interface module 40 are now described in further detail. Line 63 is connected to the lock output pulse from the common contact 53 of the lock relay 43. Line 64 is connected to the normally closed contact 55 of the lock relay 43, and line 65 is connected to the normally open contact 57 of the lock relay. Line 65 provides for the output polarity selection for the lock pulse. Line 66 may carry a negative lock pulse from the security controller 30 via the connector 75. Line 67 may carry the +12 Volt supply from the security controller 30. Line 68 may carry the negative first unlock pulse from the security controller 30. Line 70 may carry the negative second unlock pulse from the security controller 30. Line 71 is illustratively connected to provide the negative output for the second output pulse. Line 72 provides the output polarity second for the unlock pulse and is connected to the normally open contact 58 of the unlock relay 45. Line 73 is connected to the normally closed contact 56 of the unlock relay 45. Line 74 is connected to the common contact 54 of the unlock relay 45.

The vehicle security system 10 can advantageously be installed on a given one of a plurality of various vehicles. The door lock circuit of the given vehicle 11 can include a negative pulse multi-wire door lock circuit, a positive pulse multi-wire door lock circuit, a reversal rest at ground door lock circuit, or a reversal rest at positive door lock circuit. Accordingly, the multi-vehicle compatible interface module 40 can be configured for interfacing with the respective negative pulse multi-wire door lock circuit, the positive pulse multi-wire door lock circuit, or the reversal rest at a predetermined voltage (ground or positive) door lock circuit as will be readily appreciated by those skilled in the art. These configurations can be readily obtained using the lock and unlock relays 43, 45 and appropriate connection of the described signal lines as described above and as will be appreciated by those skilled in the art without further discussion herein.

Figure 3:
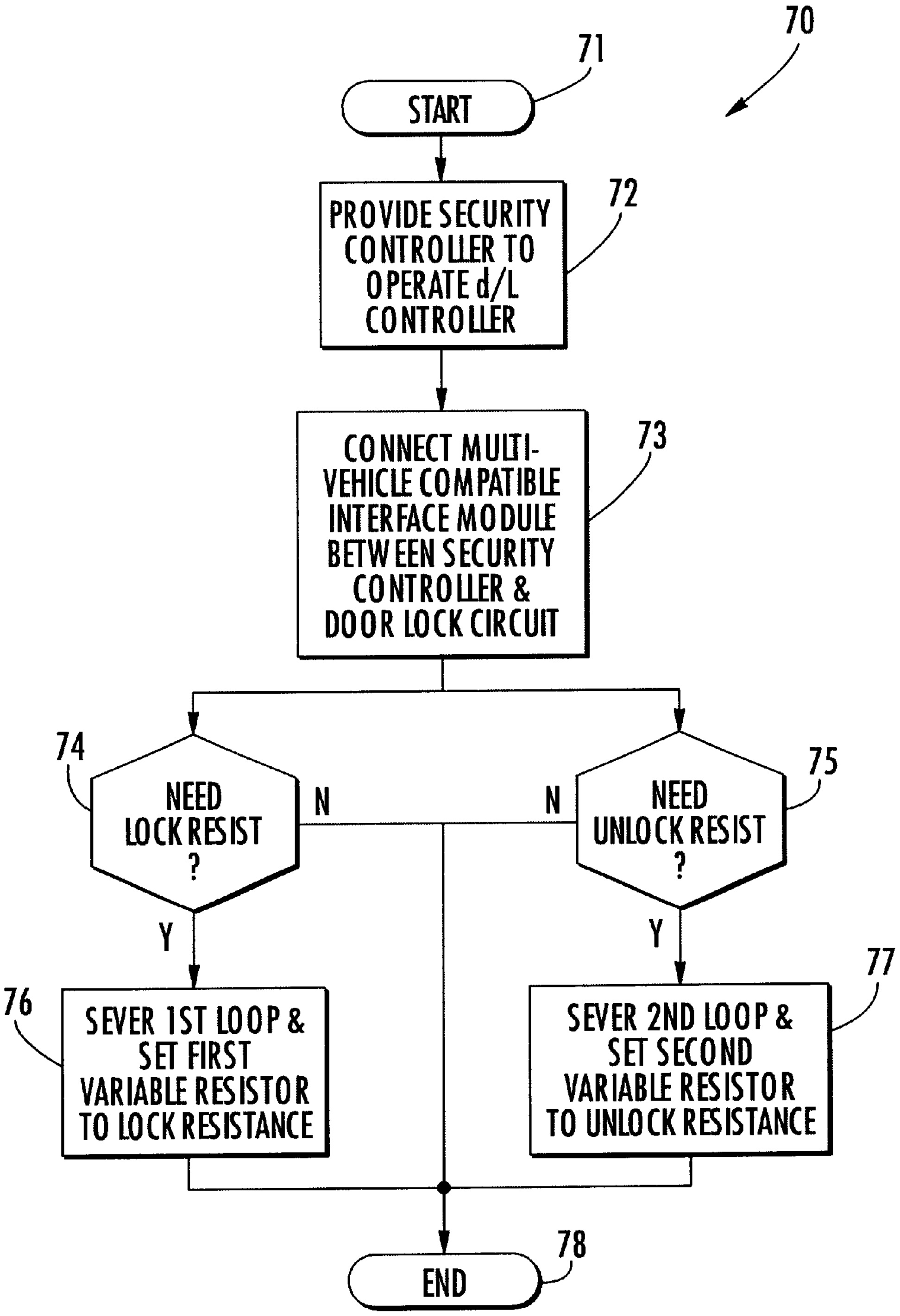
FIG. 3 is a flow chart for a method in accordance with the invention.

Turning now, additionally to the flow chart 70 of FIG. 3, an associated method aspect of the security system 10 is now described. The method is for interfacing a vehicle security controller 30 to a vehicle door lock circuit 12 including at least one of a lock resistance $R_L$ and an unlock resistance $R_{UL}$ to be selectively connected in series with a voltage reference V by a door lock switch 16 to thereby operate a door lock controller 14. From the start (Block 71), a security controller 30 is provided to operate the door lock controller 14 at Block 72. At Block 73 a multi-vehicle compatible interface module 40 is connected between the security controller 30 and the door lock circuit 12. If it is determined at Block 74 that a lock resistance is needed, then at Block 76 the first loop 61 is severed and the first variable resistor 44 is set to the lock resistance. If it is determined at Block 75 that an unlock resistance is needed, then at Block 77 the second loop 63 is severed and the second variable resistor 46 is set to the unlock resistance at Block 76 before stopping at Block 78. Of course, if the door lock circuit 12 is a positive single-wire door lock circuit, the method can include connecting the multi-vehicle compatible interface module 40 to a positive supply, and conversely, if the door lock circuit is a negative single-wire circuit, the module can be connected to the negative supply.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A vehicle security system for a vehicle comprising a door lock circuit including at least one door lock switch and at least one door lock controller responsive thereto, the vehicle security system comprising:

a security controller for selectively operating the at least one door lock controller; and a multi-vehicle compatible interface module for interfacing said security controller to the door lock circuit of a given vehicle from among a plurality of different vehicles including at least one vehicle wherein the door lock circuit comprises a single-wire door lock circuit including a lock resistance and an unlock resistance to be selectively connected in series with a voltage reference to thereby operate the at least one door lock controller, said multi-vehicle compatible interface module comprising a circuit board, a first variable resistor carried by said circuit board and being settable to match the lock resistance of the at least one door lock switch, and a second variable resistor carried by said circuit board and being settable to match the unlock resistance of the door lock switch.

2. A vehicle security system according to claim 1 wherein the door lock circuit is a positive single-wire door lock circuit; and wherein said multi-vehicle compatible interface module further comprises circuitry for interfacing to the positive single-wire door lock circuit.

3. A vehicle security system according to claim 1 wherein the door lock circuit is a negative single-wire door lock circuit; and wherein said multi-vehicle compatible interface module further comprises circuitry for interfacing to the negative single-wire door lock circuit.

4. A vehicle security system according to claim 1 further comprising:

at least one severable wire loop extending outwardly from said circuit board and having opposing ends connected in parallel with at least one of said first and second variable resistors defining a selectable bypass jumper therefor.

5. A vehicle security system according to claim 1 further comprising:

a first severable wire loop extending outwardly from said circuit board and having opposing ends connected in parallel with said first variable resistor defining a selectable bypass jumper therefor; and a second severable wire loop extending outwardly from said circuit board and having opposing ends connected in parallel with said second variable resistor defining a selectable bypass jumper therefor.

6. A vehicle security system according to claim 1 wherein each of said first and second variable resistors comprises a multi-turn variable resistor.

7. A vehicle security system according to claim 6 wherein each multi-turn variable resistor is operable over a range of about fifteen to twenty turns.

8. A vehicle security system according to claim 1 wherein the given vehicle is from among a plurality of different vehicles including at least one vehicle wherein the door lock circuit comprises a negative pulse multi-wire door lock circuit; and wherein said multi-vehicle compatible interface module further comprises circuitry carried by said circuit board for interfacing with the negative pulse multi-wire door lock circuit.

9. A vehicle security system according to claim 1 wherein the given vehicle is from among a plurality of different vehicles including at least one vehicle wherein the door lock circuit comprises a positive pulse multi-wire door lock circuit; and wherein said multi-vehicle compatible interface module further comprises circuitry carried by said circuit board for interfacing with the positive pulse multi-wire door lock circuit.

10. A vehicle security system according to claim 1 wherein the given vehicle is from among a plurality of different vehicles including at least one vehicle wherein the door lock circuit comprises a reversal rest at a predetermined voltage door lock circuit; and wherein said multi-vehicle compatible interface module further comprises circuitry carried by said circuit board for interfacing with the reversal rest at a predetermined voltage door lock circuit.

11. A vehicle security system according to claim 1 wherein said multi-Vehicle compatible interface module further comprises at least one relay carried by said circuit board.

12. A vehicle security system according to claim 1 further comprising at least one remote transmitter to be carried by a user for operating said security controller.

13. A multi-vehicle compatible interface module for interfacing a security controller to a door lock circuit of a given vehicle from among a plurality of different vehicles including at least one vehicle wherein the door lock circuit comprises a single-wire door lock circuit including at least one of a lock resistance and an unlock resistance associated with at least one door lock switch to be selectively connected in series with a voltage reference to thereby operate at least one door lock controller, the multi-vehicle compatible interface module comprising:

a circuit board, at least one variable resistor carried by said circuit board and being settable to match at least one of the lock resistance and unlock resistance of the at least one door lock switch for the given vehicle; and circuitry carried by said circuit board and cooperating with said at least one variable resistor for interfacing to the single-wire door lock circuit.

14. A multi-vehicle compatible interface module according to claim 13 wherein the at least one variable resistor comprises a first variable resistor and a second variable.

15. A multi-Vehicle compatible interface module according to claim 13 wherein the door lock circuit is a positive single-wire door lock circuit; and wherein said circuitry comprises circuitry for interfacing to the positive single-wire door lock circuit.

16. A multi-vehicle compatible interface module according to claim 13 wherein the door lock circuit is a negative single-wire door lock circuit; and wherein said circuitry comprises circuitry for interfacing to the negative single-wire door lock circuit.

17. A multi-vehicle compatible interface module according to claim 13 further comprising:

at least one severable wire loop extending outwardly from said circuit board and having opposing ends connected in parallel with said at least one variable resister defining a selectable bypass jumper therefor.

18. A multi-vehicle compatible interface module according to claim 13 wherein said at least one variable resistor comprises a multi-turn variable resistor.

19. A multi-vehicle compatible interface module according to claim 13 wherein the given vehicle is from among a plurality of different vehicles including at least one vehicle wherein the door lock circuit comprises a negative pulse multi-wire door lock circuit; and wherein said circuitry further comprises circuitry for interfacing with the negative pulse multi-wire door lock circuit.

20. A multi-vehicle compatible interface module according to claim 13 wherein the given vehicle is from among a plurality of different vehicles including at least one vehicle wherein the door lock circuit comprises a positive pulse multi-wire door lock circuit; and wherein said circuitry comprises circuitry for interfacing with the positive pulse multi-wire door lock circuit.

21. A multi-vehicle compatible interface module according to claim 13 wherein the given vehicle is from among a plurality of different vehicles including at least one vehicle wherein the door lock circuit comprises a reversal rest at a predetermined voltage door lock circuit; and wherein said circuitry comprises circuitry for interfacing with the reversal rest at a predetermined voltage door lock circuit.

22. A multi-vehicle compatible interface module according to claim 13 wherein said circuitry comprises at least one relay.

23. A multi-vehicle compatible interface module for interfacing a security controller to a door lock circuit of a given vehicle from among a plurality of different vehicles including at least one vehicle wherein the door lock circuit comprises a single-wire door lock circuit including at least one of a lock resistance and an unlock resistance associated with at least one door lock switch to be selectively connected in series with a voltage reference to thereby operate at least one door lock controller, the multi-vehicle compatible interface module comprising:

a circuit board;

a first multi-turn variable resistor carried by said circuit board and being settable to match the lock resistance of the at least one door lock switch for the given vehicle;

a second multi-turn variable resistor carried by said circuit board and being settable to match the unlock resistance of the at least one door lock switch for the given vehicle;

a first severable wire loop extending outwardly from said circuit board and having opposing ends connected in parallel with said first multi-turn variable resistor defining a selectable bypass jumper therefor; and a second severable wire loop extending outwardly from said circuit board and having opposing ends connected in parallel with said second multi-turn variable resistor defining a selectable bypass jumper therefor.

24. A multi-vehicle compatible interface module according to claim 23 wherein the door lock circuit is a positive single-wire door lock circuit; and wherein said multi-vehicle compatible interface module further comprises circuitry for interfacing to the positive single-wire door lock circuit.

25. A multi-vehicle compatible interface module according to claim 23 wherein the door lock circuit is a negative single-wire door lock circuit; and wherein said multi-vehicle compatible interface module further comprises circuitry for interfacing to the negative single-wire door lock circuit.

26. A multi-vehicle compatible interface module according to claim 23 wherein each of said first and second variable resistors comprises a multi-turn variable resistor.

27. A multi-vehicle compatible interface module according to claim 23 wherein the given vehicle is from among a plurality of different vehicles including at least one vehicle wherein the door lock circuit comprises a negative pulse multi-wire door lock circuit; and wherein said multi-vehicle compatible interface module further comprises circuitry carried by said circuit board for interfacing with the negative pulse multi-wire door lock circuit.

28. A multi-vehicle compatible interface module according to claim 23 wherein the given vehicle is from among a plurality of different vehicles including at least one vehicle wherein the door lock circuit comprises a positive pulse multi-wire door lock circuit; and wherein said multi-vehicle compatible interface module further comprises circuitry carried by said circuit board for interfacing with the positive pulse multi-wire door lock circuit.

29. A multi-vehicle compatible interface module according to claim 23 wherein the given vehicle is from among a plurality of different vehicles including at least one vehicle wherein the door lock circuit comprises a reversal rest at a predetermined voltage door lock circuits and wherein said multi-vehicle compatible interface module further comprises circuitry carried by said circuit board for interfacing with the reversal rest at a predetermined voltage door lock circuit.

30. A multi-vehicle compatible interface module according to claim 23 wherein said interface module further comprises at least one relay carried by said circuit board.

31. A method for interfacing a vehicle security controller to a vehicle door lock circuit including at least one of a lock resistance and an unlock resistance to be selectively connected in series with a voltage reference by a door lock switch to thereby operate a door lock controller, the method comprising:

connecting a multi-vehicle compatible interface module between the security controller and the door lock circuit, the multi-vehicle compatible door lock circuit comprising at least one variable resistor and associated circuitry; and setting the at least one variable resistor of the multi-vehicle compatible interface module to match at least one of the lock resistance and unlock resistance of the vehicle door lock circuit.

32. A method according to claim 31 wherein the at least one variable resistor comprises a first variable resistor and a second variable resistor, and wherein setting comprises setting both the first and second variable resistors.

33. A method according to claim 31 wherein the multi-vehicle compatible interface module further comprises at least one severable wire loop and having opposing ends connected in parallel with the at least one variable resistor, and further comprising severing the at least one severable wire loop.

34. A method according to claim 31 wherein the at least one variable resistor comprises a multi-turn variable resistor; and wherein setting comprises turning the multi-turn variable resistor to a desired resistance.

35. A method according to claim 31 wherein the circuitry of the multi-vehicle compatible interface module comprises at least one relay connected to the at least one variable resistor.

* * * * *

UNITED STATES PATENT AND TRADEMARK OFFICE
CERTIFICATE OF CORRECTION

PATENT NO. : 6,798,339 B2
DATED : September 28, 2004
INVENTOR(S) : Thompson

It is certified that error appears in the above-identified patent and that said Letters Patent is hereby corrected as shown below:

Column 1,
Line 16, delete “to remote” insert -- to a remote --

Column 4,
Line 30, delete “several” insert -- severable --

Column 7,
Lines 8 and 35, delete “multi-Vehicle” insert -- multi-vehicle --
Line 49, delete “resister” insert -- resistor --

Column 9,
Line 3, delete “circuits” insert -- circuit --

Signed and Sealed this

Seventh Day of December, 2004

JON W. DUDAS
*Director of the United States Patent and Trademark Office*